United States Patent [19]

Yang

[11] Patent Number: 5,160,809

[45] Date of Patent: Nov. 3, 1992

[54] STRUCTURE OF WIRE CONDUIT TERMINAL ASSEMBLY

[76] Inventor: Chin-Hui Yang, 4F., No. 2, Lane 409, Chung Cheng Rd., Hsin Tien City, Taipei Hsien, Taiwan

[21] Appl. No.: 666,941

[22] Filed: Mar. 11, 1991

[51] Int. Cl.⁵ .............................................. H02G 3/28
[52] U.S. Cl. ....................................... 174/48; 174/57
[58] Field of Search ..................... 174/48, 57; 220/3.7; 52/221

[56] References Cited

U.S. PATENT DOCUMENTS

| | | | |
|---|---|---|---|
| 2,811,574 | 10/1957 | Guerrero | 174/57 |
| 2,811,575 | 10/1957 | Guerrero | 174/57 |
| 3,433,886 | 3/1969 | Myers | 174/57 |
| 5,023,396 | 6/1991 | Bartee et al. | 174/48 |

Primary Examiner—Leo P. Picard
Assistant Examiner—David Tone
Attorney, Agent, or Firm—Varndell Legal Group

[57] ABSTRACT

A terminal assembly for a terminal outlet on an electric wire conduit, including a connector fastened in said terminal outlet for holding a nut in position, a socket member fastened in the nut through screw joint for holding a locating seat therein at the bottom to resiliently hold a plug socket holder by a spring. The plug socket holder is fixedly covered with a cover plate for holding an electric plug socket connected to external power supply by a cable through the electric wire conduit, which has spaced projecting strips respectively engaged with spaced projecting blocks around the inner wall of the socket member. Control of the cover plate permits the plug socket holder to be completely received inside the socket member when not in use, or extend out of the socket member for electric connection.

1 Claim, 2 Drawing Sheets

STRUCTURE OF WIRE CONDUIT TERMINAL ASSEMBLY

BACKGROUND OF THE INVENTION

The present invention is a continuation-in-part of U.S. Pat. Ser. No. 07/626,143. The present invention relates to terminal assemblies, and more particularly relates to a wire conduit terminal assembly arranged under the floor of a building for electric wiring.

In building construction, a floor wiring box is generally embedded in the concrete floor for distribution of electric wire through wiring conduits of which each has at least a terminal outlet for mounting a terminal assembly or plug socket, so that external power supply can be used inside the building. According to conventional structure, the terminal assembly on each wire conduit terminal outlet only comprises a single socket for connecting an appliance plug. Because the terminal assembly is generally covered with a cover which is fastened to the terminal outlet of the wire conduit through screw joint, the cover must be removed when an appliance or socket plug is to be connected to the socket of the terminal assembly. Because the cover must be removed from the terminal outlet of the wire conduit when an appliance or socket plug is to be connected to the socket of the terminal assembly, the cover may be lost easily.

SUMMARY OF THE INVENTION

The present invention has been accomplished to eliminate the aforesaid problems. It is therefore an object of the present invention to provide a terminal assembly for a wire conduit's terminal outlet which comprises a plurality of plug sockets for connecting a plurality of appliances or socket plugs. It is another object of the present invention to provide a terminal assembly which is movable, so that the sockets therein can be pulled out for electric connection or moved back into hiding when not in use.

DETAILED DESCRIPTION OF THE PREFERRED EMBODIMENT

Figure 1:
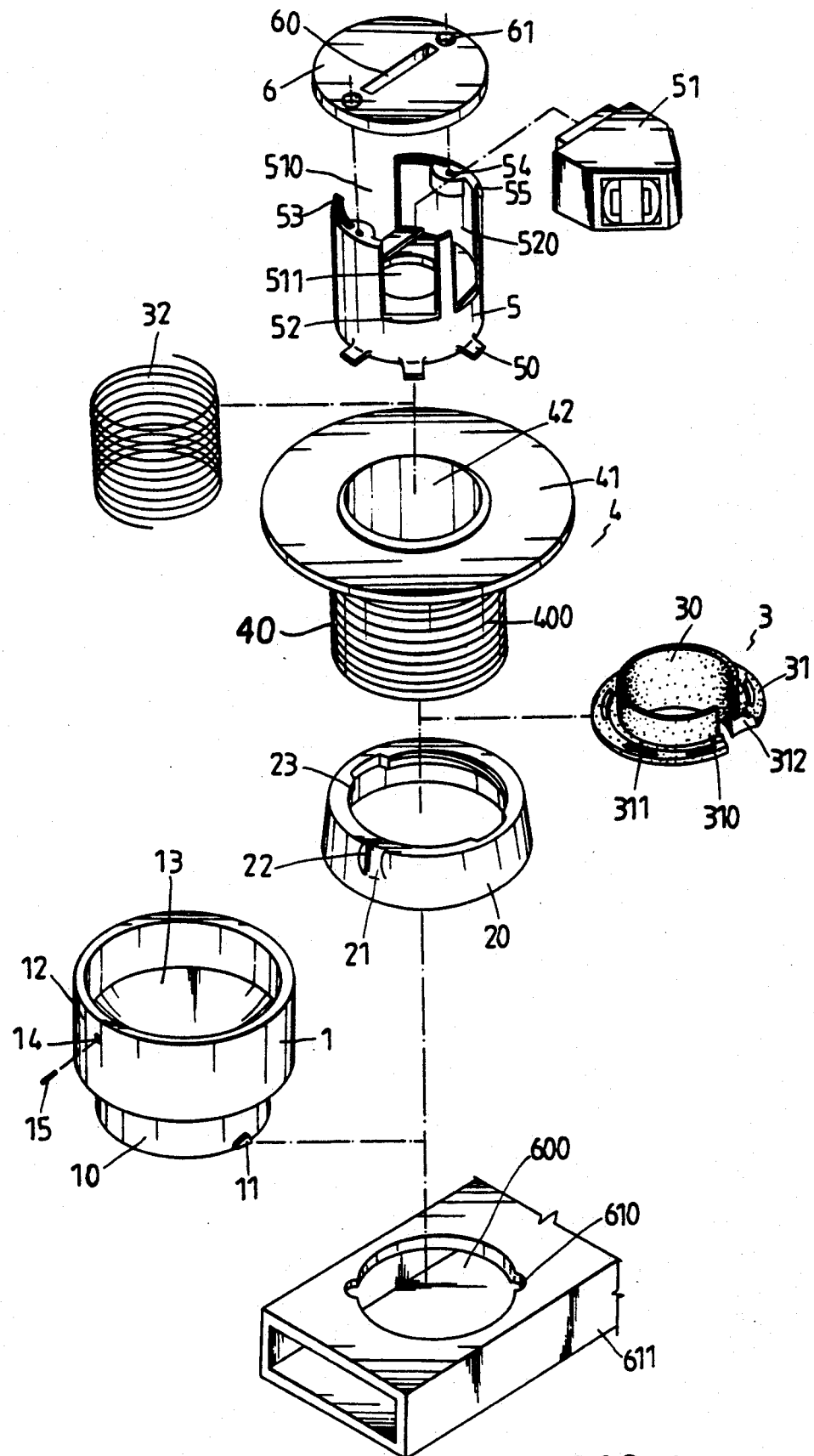
FIG. 1 is a perspective dismantled view of the preferred embodiment of the present invention.
Figure 4:
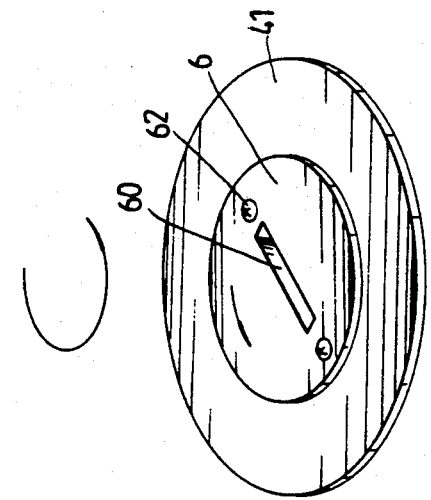
FIG. 4 illustrates that the plug socket holder has been completely received inside the socket member.
Figure 5:
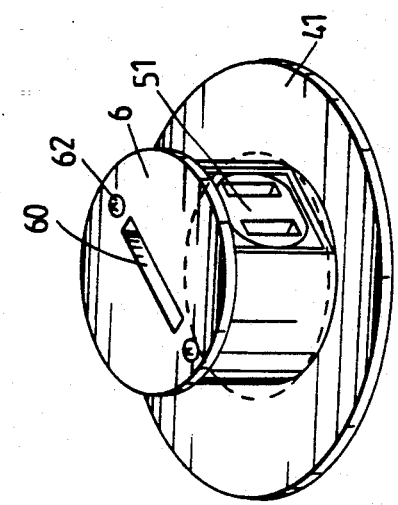
FIG. 5 illustrates that the plug socket holder is moved to protrude beyond the circular flange of the socket member permitting the plug socket retained therein to expose to the outside for electric connection.

Referring to FIG. 1, the preferred embodiment of the present invention comprises a connector 1, a nut 2, a locating seat 3, a socket member 4, a plug socket holder 5 and a cover plate 6. The connector 1 comprises a bottom cylinder 10 extending downward from the circular body 12 thereof. The bottom cylinder 10 has two raised blocks 11 at two opposite locations corresponding to the two opposite notches 610 on the terminal outlet 600 of the wire conduit 611 for mounting thereon. When the two raised blocks 11 are respectively aligned with the two opposite notches 610, the bottom cylinder 10 of the connector 1 can be conveniently inserted in the terminal outlet 600 of the wire conduit 611. After insertion into the terminal outlet 600, the connector 1 is rotated in the terminal outlet 600 through a certain angle to become locked in the wire conduit 611. The circular body 12 of the connector 1 which defines therein a circular trough 13 has a pivot hole 14 in which a lock pin 15 is fastened to lock the nut 2 inside the circular trough 13. The nut 2 comprises a ring-shaped, tapered wall 20 having an inner thread 23 at the inside and a recess 21 at the outside corresponding to the pivot hole 14 of the connector 1, which recess 21 provides the ring-shaped, tapered wall 20 with two stop edges 22 its two opposite sides to alternatively stop against movement of the lock pin 15. The socket member 4 has an outer thread 400 on the cylindrical bottom neck 40 thereof screwed up with the inner thread 23 of the nut 2; a broad, circular flange 41 at the top; and a center hole 42 through the central axis thereof. The cylindrical bottom neck 40 of the socket member 4 has a projecting strip 401 at the inside to lock the locating seat 3 in position. The locating seat 3 comprises a cylindrical body 30 having a circular flange 31 obliquely projecting upwards and outwards, a sloping surface portion 310 on said circular flange 31 at the inner side, a plurality of elongated slots 311 on said circular flange 31 at the outer side, and a notch 312 at one side. There is provided a spring 32 set in the center hole 42 of the socket member 4 and retained in the sloping surface portion 310 of the locating seat 3 to support the plug socket holder 5. The plug socket holder 5 comprises a cylindrical body 52 defining therein a receiving space 510 for holding at least a plug socket 51, having a wiring hole 511 at the center through which electric wire from the wire conduit 611 can be connected to said plug socket 51, a plurality of projecting strips 50 around the periphery of the bottom end thereof, three openings 520 on said cylindrical body 52 at which the outlet of said plug socket 51 can be alternatively disposed, two raised blocks 55 transversely projecting inwards at two opposite locations at the top with a bolt hole 54 each respectively made thereon, and a projecting edge 53 around the topmost surface portion thereof. The cover plate 6 is set inside the projecting edge 53 and stopped at the two raised blocks 55 to cover the receiving space 510 of the plug socket holder 5, having a rectangular slot 60 at the top and two bolt holes 61 at two opposite locations through which screws 62 are respectively fastened into the bolt holes 54 of the two raised blocks 55 to secure the cover plate 6 to the plug socket holder 5.

Figure 3:
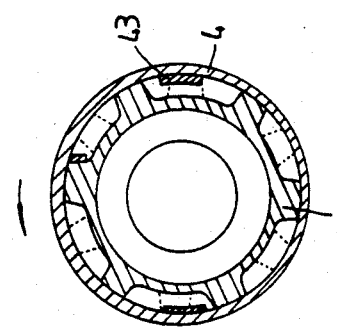
FIG. 3 illustrates an operation to disengage the projecting strips of the plug socket holder from the retaining strips of the socket member 4.
Figure 2:
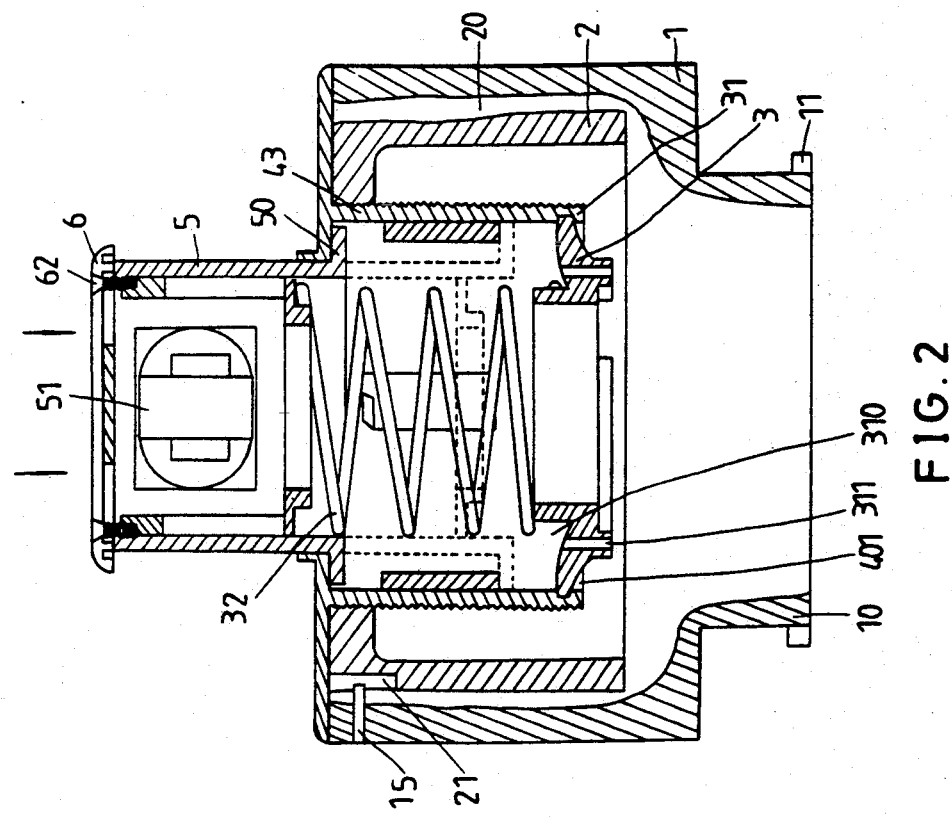
FIG. 2 is a sectional assembly view of the preferred embodiment of the present invention taken along longitudinal direction.

Referring to FIGS. 2 and 3, when the terminal assembly is not in use, the cover plate 6 is rotated to drive the projecting strips 50 of the plug socket holder 5 to respectively dislocate from the retaining strips 43 which are made on the inner wall surface of the center hole 42 of the socket member 4. After the projecting strips 50 of the plug socket holder 5 are respectively disengaged from the retaining strips 43 of the socket member 4, the cover plate 6 is squeezed downward to conceal the plug socket holder 5 inside the socket member 4 and then rotated in reverse direction permitting the projecting strips 50 to be respectively retained by the retaining strips 43 at the bottom. When in use, the cover plate 6 is rotated to drive the projecting strips 50 to disengage from the retaining strips 43 permitting the spring 32 to automatically push the plug socket holder 5 to project over the circular flange 41 of the socket member 4, so that the outlet of the plug socket 51 which is mounted in the receiving space 510 of the plug socket holder 5 is exposed to the outside for electric connection.

I claim:

1. A terminal assembly for a terminal outlet of an electric wire conduit, comprising a connector fastened in a terminal outlet of an electric wire conduit, said connector holding a nut fastened to a socket member through a screw joint, said socket member having a locating seat fastened therein, said locating seat holding a spring supporting a plug socket holder, said plug socket holder holding at least one electric plug socket, and a cover plate covering said plug socket holder;

said socket member having a cylindrical bottom neck with an outer thread screwed in said nut by said screw joint and a top with a broad, circular flange; a center hole passing through a central axis of said socket member; said center hole having a projecting strip transversely disposed at a lower position thereof and a plurality of spaced retaining blocks around an inner wall surface thereof at a higher position thereof;

said locating seat including a cylindrical body set in said center hole of said socket member at a bottom thereof, said cylindrical body having a circular flange obliquely projecting upwards and outwards and defining a tapered surface portion for holding said spring supporting said plug socket holder, said tapered surface portion having a top with a plurality of elongated slots and a side with a notch locking said projecting strip of said socket member therein;

said plug socket holder including a cylindrical body with a receiving space for holding said at least one electric plug socket, a wiring hole at a center thereof for connecting electric wire from said wire conduit to said plug socket, a bottom with a plurality of spaced projecting strips extending around a periphery thereof;

said cylindrical body having three openings for exposing an outlet of said at least one electric plug socket, a top with two raised blocks transversely projecting inwards at opposite locations each respectively containing a bolt hole therein, and a projecting edge extending around a topmost surface portion thereof;

said cover plate receiving said projecting edge of said plug socket holder and abutting said two raised blocks for covering said receiving space, said cover plate having a top with rectangular slot and two bolts holes at opposite locations through which fastening screws are fastened into said bolt holes on said two raised blocks of said plug socket holder for securing said cover plate to said plug socket holder;

said cover plate rotating said plug socket holder between an open position where said outlet is exposed for electric connection and a closed position where said outlet is completely concealed inside said socket member, so that in said closed position said projecting strips of said plug socket holder are aligned with and held under said retaining blocks of said socket member, and in said open position said projecting strips together with said outlet can move upward and downward along said center hole of said socket member.

* * * * *